United States Patent
Abraham et al.

(10) Patent No.: US 7,388,838 B2
(45) Date of Patent: Jun. 17, 2008

(54) METHOD AND APPARATUS FOR ADJUSTABLE QOS BASED ADMISSION CONTROL AND SCHEDULING WLANS

(75) Inventors: Santosh P Abraham, Keasbey, NJ (US); Mooi Choo Chuah, Marlboro, NJ (US); Tao Liu, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 906 days.

(21) Appl. No.: 10/652,277

(22) Filed: Aug. 29, 2003

(65) Prior Publication Data

US 2005/0048983 A1 Mar. 3, 2005

(51) Int. Cl.
*H04L 12/26* (2006.01)
(52) U.S. Cl. .................................................. 370/235
(58) Field of Classification Search ................ 370/229, 370/230, 235, 237, 248, 232, 253, 429, 395.21, 370/395.41, 395.42, 395.43, 238, 235.1, 370/252, 231, 412, 358, 389, 391, 411, 428
See application file for complete search history.

(56) References Cited

U.S. PATENT DOCUMENTS

| | | | |
|---|---|---|---|
| 5,132,966 A * | 7/1992 | Hayano et al. ............. 370/233 |
| 6,498,783 B1 * | 12/2002 | Lin ............................ 370/252 |
| 6,584,080 B1 * | 6/2003 | Ganz et al. ................. 370/315 |
| 6,973,315 B1 * | 12/2005 | Miernik et al. .......... 455/452.2 |
| 2003/0058871 A1 * | 3/2003 | Sastry et al. ................ 370/401 |
| 2003/0169716 A1 * | 9/2003 | Saito .......................... 370/338 |
| 2004/0165528 A1 * | 8/2004 | Li et al. ..................... 370/230 |

* cited by examiner

*Primary Examiner*—Brenda Pham

(57) ABSTRACT

An advance over the prior art is achieved through an efficient method for an admission control algorithm and a scheduling mechanism that complement each other in providing the following three classes of service. A first class of service is termed Class 1 where users specify a nominal amount of bandwidth desired. A second, lower tier service class is termed Class 2, wherein users specify a nominal and minimum amount of bandwidth desired when entering into a network connection. A third server class is Class 3, where Class 3 users are treated as best effort users. For Class 1 users the methodology of the present invention provides a guaranteed nominal amount of bandwidth. The admission control procedure ensures that Class 1 users are admitted only if resources exist to satisfy the nominal bandwidth requirements of the Class 1 users. Class 2 users are admitted if resources exist to satisfy the minimum bandwidth requirements of the user. Class 2 users are served with a bandwidth of up to their nominal bandwidths if there is capacity left after serving the Class 1 users with their nominal capacities. Class 3 users are served only if the Class 2 users have received their nominal bandwidths.

15 Claims, 2 Drawing Sheets

Scheduler at a gateway.

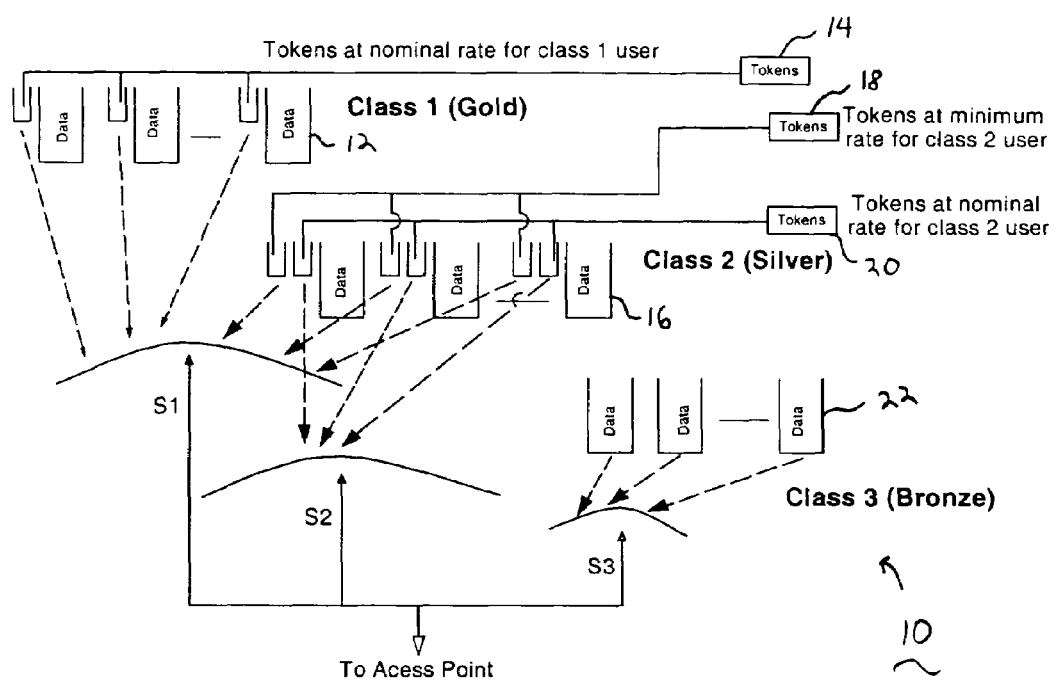
Figure 1: Scheduler at a gateway.

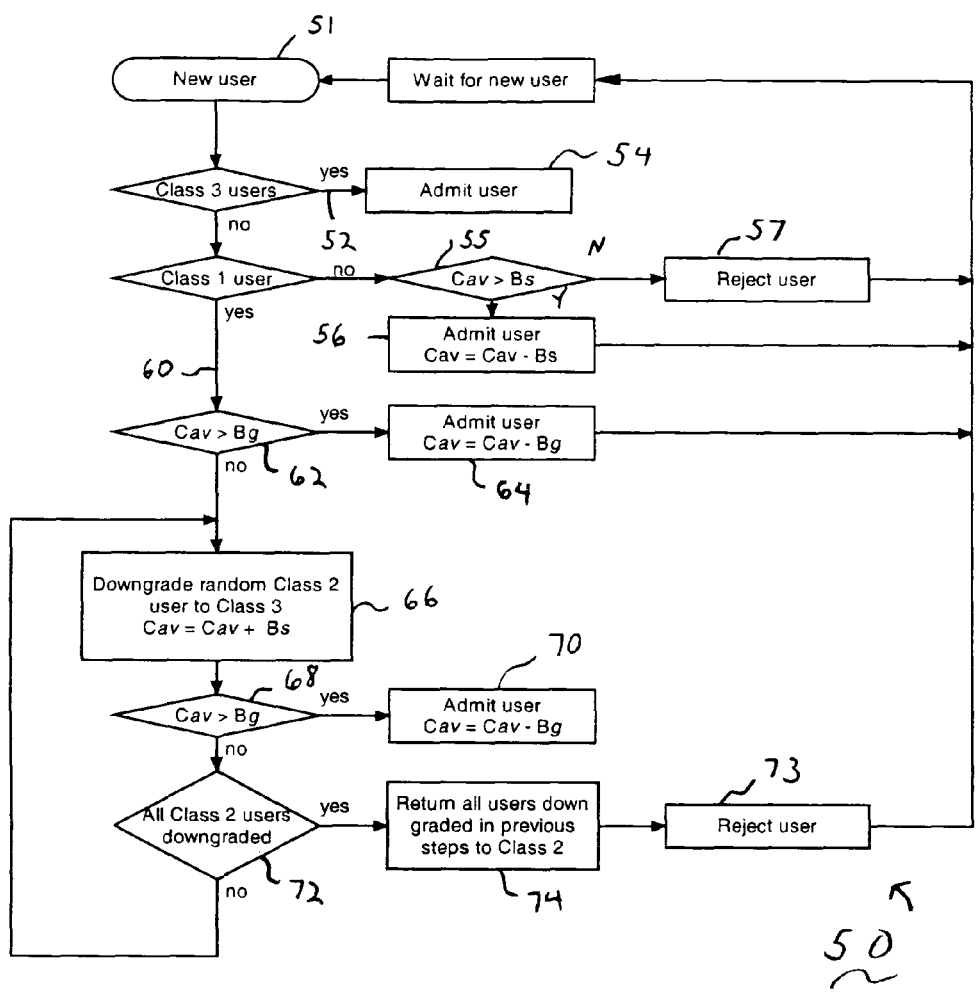
Figure 2: Adjustable QoS Admission Control Procedure

METHOD AND APPARATUS FOR ADJUSTABLE QOS BASED ADMISSION CONTROL AND SCHEDULING WLANS

FIELD OF THE INVENTION

The present invention relates generally to communications networks and more particularly to wireless communications regarding such networks.

BACKGROUND OF THE INVENTION

Wireless service providers need to provide efficient quality of service oriented hotspot services to serve a growing community of users that need wireless Internet access, for example. Hot spots, which are technically wireless fidelity (Wi-Fi) access points have been established in various public and private places to enable individuals having mobile computing devices and the like, such as laptops and PDAs, to be able to access a wireless local area network to enable access, for example, to the internet. Such service providers can increase revenue by providing different grades of service to users. In order to provide the QoS based discrimination, efficient scheduling and admission control algorithms are required.

A wireless broadband access telecommunications system is desired which can provide a QoS capability that is comparable to that delivered by wireline broadband access devices. Conventionally, one of the barriers to the deployment of wireless broadband access systems has been the absence of acceptable QoS characteristics, while at the same time delivering bandwidth sufficient to qualify as broadband. Delivery of raw bandwidth over wireless media without acceptable QoS would not benefit end users. Likewise, the delivery of a high level of QoS at the cost of sufficient bandwidth would also not benefit endusers.

SUMMARY OF THE INVENTION

An advance over the prior art is achieved through an efficient method for an admission control algorithm and a scheduling mechanism that complement each other in providing the following three classes of service. A first class of service is termed Class 1 where users specify a nominal amount of bandwidth desired. A second, lower tier service class is termed Class 2, wherein users specify a nominal and minimum amount of bandwidth desired when entering into a network connection. A third server class is Class 3, where Class 3 users are treated as best effort users.

For Class 1 users the methodology of the present invention provides a guaranteed nominal amount of bandwidth. The admission control procedure ensures that Class 1 users are admitted only if resources exist to satisfy the nominal bandwidth requirements of the Class 1 users. Class 2 users are admitted if resources exist to satisfy the minimum bandwidth requirements of the user. Class 2 users are served with a bandwidth of up to their nominal bandwidths if there is capacity left after serving the Class 1 users with their nominal capacities. Class 3 users are served only if the Class 2 users have received their nominal bandwidths. In another embodiment of the invention, Class 3 users are served as long as Class 2 users receive their minimum bandwidth.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 1 illustrates one exemplary embodiment of a scheduler in accordance with the present invention. methodology for computing channel utilization according to the present invention; and FIG. 2 is an exemplary embodiment of an admission control algorithm in accordance with the present invention.

DETAILED DESCRIPTION

Within the description of the present invention there is set forth an admission control technique and a scheduling mechanism that complement each other in providing differing classes of service. An exemplary embodiment of the invention includes three classes of service: A first class of service is termed Class 1 (Gold)—in accordance with the present invention Class 1 users specify a nominal amount of bandwidth desired. A second, lower tier service class is termed Class 2 (Silver)—Class 2 users, as will be explained, specify a nominal and minimum amount of bandwidth desired when entering into a network connection. For example, a user in its admission control request may specify a minimum 32 Kbps service but a nominal rate of 64 Kbps. A third server class is class 3 (Bronze), where Class 3 users are treated as best effort users. Although the exemplary embodiment is described as having 3 service classes, it would be understood by those persons skilled in the art that the invention would be applicable to more than three classes. In addition, although the exemplary embodiment of the present invention does not specifically address mid-session bandwidth negotiations, where for example, minimum and nominal rate bandwidth requirements may be changed, such a notion is contemplated within the scope of the present invention. Those skilled in the art of admission control techniques would understand how to modify the admission control call flow of the invention to handle such a case.

It is anticipated that Class 1 users will be charged more for the premium service they receive. In order to maximize revenue at the service provider, it is logical to want to maximize the number of Class 1 users in the system. Also note that users who have paid the higher price for a "subscription" to Class 1 services will expect a low call blocking probability. The admission control procedure of the invention thus provides the capability of down grading a number of Class 2 users to class 3 if sufficient resources are not available to admit the incoming Class 1 user.

Scheduling Protocol at Gateway

One manner of implementing the present invention is to include a scheduling algorithm at an access point to a network, for example, a gateway serving hot spot areas. A scheduling technique according to the invention accomplishes the following two goals:
1. Ensures that Class 1 users receive their nominal rates and Class 2 users receive their minimum rates.
2. Subject to 1 above, provides Class 2 users with their nominal rates before serving the Class 3 users.

In order to clearly explain the operation of the scheduler, it is assumed that all connections have a fixed packet size. FIG. 1 shows a schematic of the scheduler 10 to be implemented at the gateway. Each Class 1 user is provided with a data queue 12 and a token bucket 14 of a specified depth. Tokens flow into the Class 1 users' token buckets 14 at the nominal rate for Class 1. Each Class 2 user has a data queue 16 and two token buckets 18, 20. In one of the token buckets 18, tokens flow at the minimum rate for Class 2. In the other bucket 20, the tokens flow in at the nominal rate for Class 2. Each Class 3 (best effort) user has a data queue 22 only.

Three schedulers S1, S2 and S3 are included for implementation of the invention. Although described as three schedulers, it would be understood, that the multiple schedulers could be part of a single scheduler unit carrying out multiple scheduling tasks. When a packet is to be sent to an Access Point (AP), scheduler S1 is called or checked to see if it can schedule a packet or packets first. S1 scans the token buckets for Class 1 users and the minimum rate token buckets for Class 2 users. When scheduler S1 finds a token bucket that has a token and a packet to send in the corresponding data queue, it schedules the packet for transmission. The token is then removed from the token bucket. If the queue chosen is a Class 2 user, it might have tokens in both the minimum and nominal rate queues. In order to ensure that the rate obtained by a Class 2 user is bounded by the nominal rate, a token is also removed from the nominal rate token bucket.

If a scan by scheduler S1 yields no queues with both tokens and packets, then scheduler S2 is called. Scheduler S2 scans the nominal rate token buckets for Class 2 users only. If a user is found with both a token and a packet, the packet is sent to the AP. The token from the nominal rate bucket is removed. In order to ensure that the rate obtained by the Class 2 user is bounded by the nominal rate, we remove a token from the minimum rate token bucket also, if one is present. If no users are found by scheduler S1 and S2, scheduler S3 is called. Scheduler S3 serves the best effort queues in a simple round robin fashion.

The above algorithm can be easily extended to the case where the packet sizes vary. Note that each token represents a permit to remove a certain fixed number of bytes (N) from the network queue. The token bucket can be easily implemented as a counter (with count, e.g., C) whose count is increased by N at the token arrival time. Constraining C to remain less than a specified maximum number easily incorporates the notion of a limited size token bucket. When the scheduler checks a particular queue, it can remove as many packets such that the total byte size of the packets removed does not exceed C. If the queue has lesser bytes than C, then C is decremented by the number of bytes removed.

Admission Control Procedure

The admission control procedure generally consists of two steps. In a first step an AP is chosen for the arriving traffic of a user. The procedure for choosing an AP attempts to achieve load balancing across the APs. Note that different AP's may have different air link capacities as would occur, for example, in an environment where there are both 802.11b and 802.11 g APs. There are several reasons why load balancing is important, for example, it is more advantageous for a Class 3 session to be admitted at an AP with a lower Class 2 and Class 1 load. Similarly, a Class 2 session can achieve rates closer to its nominal rate (rather than minimum rate) if it uses an AP with a lower number of Class 1 users. The following notation is used in describing the admission control procedure in accordance with the present invention.

| | |
|---|---|
| C | Total available capacity at an AP. |
| $C_{av}$ | Current available capacity. Initially $C_{av}$ = C |
| $B_g$ | Nominal bandwidth requirement for Class 1 (gold) users |
| $B_s$ | Minimum bandwidth requirement for Class 2 (silver) users |
| $B_{snom}$ | Nominal bandwidth for Class 2 (silver) users. |

When a new user operating user equipment (UE) arrives into a communications network, it scans the different channels to pick up the AP beacons. The UE stores the signal strength of all the AP's it can hear. It then performs a layer 2 association, for example, with the AP having the strongest signal strength. (Although a layer 2 association is described in connection with the exemplary embodiment, it would be understood that other association types may also be utilized. Once the association is completed, the UE contacts the gateway with the list of APs (and their corresponding signal strengths). The gateway first executes a load balancing procedure using the list of APs (and associated received signal strength) supplied by the UE and information about the traffic. The procedure for load balancing for the different Class of users is given below. Let $P_{th}$ denote a minimum power threshold requirement for a UE to be assigned to an AP. $P_{th}$ is chosen based on air link loss probability requirements which are known in the art. If the received power level from all associated AP's is below $P_{th}$ then the AP with the highest signal strength is chosen. Let $n_g$, $n_s$ and $n_b$ denote the number of Class 1 (gold), Class 2 (silver) and Class 3 (bronze) users respectively at any AP.

1. Class 3: Choose the AP, with received strength $P_{th}$ that has the highest $(C-n_g B_g - n_s B_{snom})/(n_b+1)$ 2. Class 2: When a Class 2 user arrives, choose the AP, with received strength $P_{th}$ that has the maximum.

$C-n_g B_g - n_s B_s$

If there are two or more AP's that have the same maximum, then choose the one with the least number of Class 3 users.

3. Class 1: Simply choose the AP, with received strength $P_{th}$ that has the largest $C/n_g$ The admission control algorithm of the present invention is advantageous in that it allows assignment of a WLAN user to the AP with the best signal, that is also least loaded, as well as being able to meet the user's QOS requirement. A flow chart 50 of the admission control procedure once an AP is chosen is presented in FIG. 2. In the exemplary procedure it is assumed that all users in the same Class have the same bandwidth requirements. This procedure may be easily extended to the case where users in a Class have different requirements. An exemplary representation for such a more general scenario can be:

$[C-(Sum\_\{i=1\}^\{i=n\_g\}B\_g(i))-Sum\_\{i=(n\_g+1)\}^\{i=n\_g+n\_s\}B\_snom(i))]/ (nb+1)$ for Class 3, and $[C-(Sum\_\{i=1\}^\{i=n\_g\}B\_g(i))-Sum\_\{i=(n\_g+1)\}^\{i=n\_g+n\_s\}B\_s(i))]$ for Class 2 where persons skilled in the art would understand implementation thereof.

A new user arrives at box 51 and the policy essentially determines which class of user the new user is. When a Class 3 user arrives 52 a policy is used to determine whether it is to be admitted. A typical policy can be to limit the number of Class 3 user to a pre-specified maximum 54, although in other embodiment Class 3 users may always be considered to be admitted, but will not be served unless bandwidth is available. When a Class 2 user arrives, it is admitted if there is sufficient available capacity to satisfy the minimum bandwidth requirement of the Class 2 user 55, 56. If the minimum Class 2 bandwidth cannot be supported, the user is dropped 57.

When a Class 1 user arrives 60, the algorithm checks if the available capacity can support the nominal bandwidth requirement of the Class 1 user 62. If sufficient capacity is available, the Class 1 user is admitted 64. However, if the available capacity is lesser than the Class1 nominal requirement, a randomly chosen Class 2 user is downgraded to Class 3 66, correspondingly, the available capacity is increased by the minimum Class 2 bandwidth requirement. Once the available capacity is increased sufficiently to satisfy the Class 1 users requirements 68, the Class 1 user is admitted 70. If the downgrading of all Class 2 users does not produce sufficient available capacity to admit the new Class 1 user 72, it is rejected 73 and the users who were downgraded from Class 2 to Class 3 are returned to Class 2 74.

In summary, the present invention uses S1 to scan both user1 and user2 queues. For user2 queue, the invention will only serve a packet if it has tokens generated from the minimum rate. In order to make sure that we do not serve the user 2 queue with more than nominal rate, whenever you serve a packet from user 2 queue, you also remove its tokens come the nominal rate generator. Now, when there are no tokens for user 1 & 2 queues (for user 2 this is the minimum rate token pool), then S2 takes over and S2 will see if there are tokens left from nominal rate.

In another embodiment of the invention, rather than downgrading Class 2 users in order to admit Class 1 users, optionally, Class 1 users may be denied admission if there is no available bandwidth, rather than forcing Class 2 users to be downgraded to Class 3.

It should be noted that in the context of the exemplary embodiment, it is assumed that the nominal and minimum bandwidths requested by Gold and Silver class users are the same. A person skilled in the art can easily modify the algorithm to include the cases where the nominal and minimum bandwidths requested by both classes of users are not the same. For this more general case, the scheduling algorithm can be modified such that the excess bandwidths allocated to the silver class users will be based on fair proportions of their minimum bandwidths and a minimum total bandwidth is allocated to all best effort users (to ensure that best effort users are not completely starved when users of all classes are actively generating packets).

For an example, if we have 11 Mbps bandwidth, we can say we reserve 512 Kbps to serve all best effort users (note that this 512 Kbps is only allocated after serving Class 1 users' nominal rates and Class 2 users minimum rates are met but before all excess bandwidths are allocated to Class 2 users).

Alternate Admission Control Policy

An alternate embodiment of an admission control policy for admitting new users in accordance with the present invention is now described. In connection with the alternate embodiment, every user is assumed to belong to a particular priority class, e.g., Class 1, Class 2, etc. However, each user's actual bandwidth requirement is flexible and is thus independent of the user's priority class. Each user request arrives with a desired nominal bandwidth and a minimum bandwidth requirement. A system wide parameter is set for the maximum available bandwidth for any priority class.

When a new user arrives, if its nominal bandwidth requirement is higher than the maximum bandwidth of its user priority class, then the nominal bandwidth is set to the maximum allowable bandwidth of the user class. If the requested nominal bandwidth is less than the available bandwidth, the user is admitted and the nominal bandwidth required is allocated to the user. However, if the available bandwidth is less than the nominal bandwidth required, then the allocation to users of a lower priority class is reduced to accommodate the nominal bandwidth requirement of the new user. The following procedure is used for reducing the rate for users in the lower priority classes.

$$B_{after} = B_{before} - (B_{before} - B_{minimum-guaranteed})/2.$$

Note that this adjustment will not decrease the allocated rate to a user in the system to below the minimum guaranteed rate. If this reduction does not yield sufficient bandwidth to support the nominal rate of the newly arriving user, the new user is dropped.

For clarity of explanation, the illustrative embodiment of the present invention has been described as comprising individual functional blocks and/or boxes. The functions these blocks and/or boxes represent may be provided through the use of either shared or dedicated hardware, including, but not limited to, hardware capable of executing software. Use of the term "processor" should not be construed to refer exclusively to hardware capable of executing software. Further, the illustrative embodiment may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of providing admission control in a wireless communications network, said method having at least three differing quality of service levels, Class 1, Class 2 and Class 3, wherein Class 1 of said three differing quality of service levels is guaranteed a nominal amount of bandwidth, and Class 2 users specify a minimum rate and a nominal rate, said method comprising the steps of:
    admitting users to said wireless communications network such that Class 1 users are ensured to receive their nominal rates and Class 2 users receive their minimum rates; and
    providing Class 2 users with their minimum rates before serving Class 3 users;
    wherein one or more Class 2 users are downgraded to a lower service level to provide sufficient bandwidth for admission of a Class 1 user requesting admission,
    said method of admission control attempts to achieve load balancing across potential access points in said wireless network when admitting new users, and
$P_{th}$ denotes a minimum power threshold requirement for user equipment to be assigned an access point, and wherein $n_g$, $n_s$ and $n_b$ denote the number of Class 1, Class 2 and Class 3 users, respectively, at any access point (AP), wherein said method of admission control chooses an AP for a class 3 user, with received strength P that has a highest value according to the expression $$(C-n_s B_s - n_s B_{snom})/(n_b+1)$$

wherein,

| | |
|---|---|
| C = | Total available capacity at an AP, |
| $C_{av}$ = | Current available capacity, |
| $B_g$ = | Nominal bandwidth requirement for Class 1 users, |
| $B_s$ = | Minimum bandwidth requirement for Class 2 users, |
| $B_{snom}$ = | Nominal bandwidth for Class 2 users. |

2. The method of claim 1, wherein Class 2 users attempt to choose an AP with received strength P that has the maximum value $C-n_g B_g - n_s B_s$.

3. The method of claim 2, wherein if there are two or more AP's that have the same maximum value, then choose the one with the least number of Class 3 users.

4. A method of providing admission control in a wireless communications network, said method having at least three differing quality of service levels, Class 1, Class 2 and Class 3, wherein Class 1 of said three differing quality of service levels is guaranteed a nominal amount of bandwidth, and Class 2 users specify a minimum rate and a nominal rate, said method comprising the steps of:
    admitting users to said wireless communications network such that Class 1 users are ensured to receive their nominal rates and Class 2 users receive their minimum rates; and
    providing Class 2 users with their minimum rates before serving Class 3 users;
    wherein one or more Class 2 users are downgraded to a lower service level to provide sufficient bandwidth for admission of a Class 1 user requesting admission,
    said method of admission control attempts to achieve load balancing across potential access points in said wireless communications network when admitting new users, and
    Class 1 users attempt to select an access point (AP) having received strength P that has a largest $$C/n_g$$

where Pth denotes a minimum power threshold requirement for user equipment to be assigned an access point, C denotes total available capacity at an AP and $n_g$ denotes the number of Class 1 users at an AP.

5. The method of claim 4, wherein admissions of Class 3 users are attempted at APs having lower Class 2 and Class 1 loads relative to other APs in said network.

6. The method of claim 5, wherein Class 2 users are attempted to be admitted at APs with a lower number of Class 1 users relative to other APs in said network.

7. A method of providing admission control in a wireless communications network, said method having at least three differing quality of service levels, Class 1, Class 2 and Class 3, wherein Class 1 of said three differing quality of service levels is guaranteed a nominal amount of bandwidth, and Class 2 users specify a minimum rate and a nominal rate, said method comprising the steps of:
    admitting users to said wireless communications network such that Class 1 users are ensured to receive their nominal rates and Class 2 users receive their minimum rates; and
    providing Class 2 users with their minimum rates before serving the Class 3 users;
    wherein one or more Class 2 users are downgraded to a lower service level to provide sufficient bandwidth for admission of a Class 1 user requesting admission,
    said method of admission control implemented utilizing a scheduling mechanism, said scheduling mechanism includes:
    a data queue and token bucket for each Class 1 user, said Class 1 token bucket flowing at a Class 1 nominal rate,
    a data queue and first and second token bucket for each Class 2 user, said first token bucket flowing at a minimum rate and said second token bucket flowing at a nominal rate, and
    a data queue for each Class 3 user.

8. The method of claim 7, wherein scheduling in said scheduling mechanism comprises the steps of:
    scanning token buckets for Class 1 users and minimum rate token buckets for Class 2 users;
    scheduling a packet for transmission when finding a token bucket that has a token and a packet to send in the corresponding data queue;
    scanning the nominal rate token buckets for Class 2 users, wherein if a user is found with both a token and a packet, the packet is transmitted and a token from the nominal rate bucket is removed; and
    serving best effort queues if no Class 1 and Class 2 users are found.

9. The method of claim 8, wherein one or more token buckets are implemented utilizing counters.

10. The method of claim 8, wherein a minimum bandwidth is reserved for Class 3 users.

11. The method of claim 8, wherein a token from the minimum rate token bucket is also selected for Class 2 users, if available, so as to bound Class 2 users by a nominal rate.

12. The method of claim 7, wherein Class 2 users are provided with their nominal rates before serving the Class 3 users.

13. An admission control method for use in a wireless network, wherein users of the wireless network are each part of a particular priority class, wherein a bandwidth requirement for each user is flexible, wherein an admission request from a user arrives with a desired nominal bandwidth and a minimum bandwidth requirement and a system wide parameter is set for the maximum available bandwidth for any priority class, said method comprising:

setting nominal bandwidth of a new user to a maximum allowable bandwidth of a user class if its nominal bandwidth requirement is higher than the maximum bandwidth of its priority class admitting a user and allocating required nominal bandwidth if the requested nominal bandwidth is less than the available bandwidth; and if available bandwidth is less than the nominal bandwidth required, then reducing allocation to users of a lower priority class to accommodate the nominal bandwidth requirement of the new user, wherein an allocated bandwidth for users in lower priority classes is reduced according to $$B_{after} = B_{before} - (B_{before} - B_{minimum-guaranteed})/2, \text{ wherein}$$

$B_{after}$ is the allocated bandwidth for users in the lower priority class after the allocation reduction, $B_{before}$ is the allocated bandwidth for users in the lower priority class before the allocation reduction, and $B_{minimum-guaranteed}$ is a minimum guaranteed rate for users of the lower priority class.

14. A method of providing admission control in a wireless communications network, said method having at least three differing quality of service levels, Class 1, Class 2 and Class 3, wherein Class 1 of said three differing quality of service levels is guaranteed a nominal amount of bandwidth, and Class 2 users specify a minimum rate and a nominal rate, said method comprising the steps of:

admitting users to said wireless communications network such that Class 1 users are ensured to receive their nominal rates and Class 2 users receive their minimum rates; and providing Class 2 users with their minimum rates before serving the Class 3 users;

wherein one or more Class 2 users are downgraded to a lower service level to provide sufficient bandwidth for admission of a Class 1 user requesting admission, said method of admission control attempts to achieve load balancing across potential access points in said wireless communications network when admitting new users, and $P_{th}$ denote a minimum power threshold requirement for user equipment to be assigned an access point, and wherein $n_g$, $n_g$ and $n_b$ denote the number of Class 1, Class 2 and Class 3 users, respectively, at any access point (AP), wherein said method of admission control chooses an AP, with received strength P that has a highest value according to the expression $$[C - (\text{Sum}\_\{i=1\}^\{i=n\_g\} B\_g(i)) - \text{Sum}\_\{i=(n\_g+1)\}^\{i=n\_g+n\_s\} B\_\text{snom}(i))] / (nb+1)$$

| | |
|---|---|
| C = | Total available capacity at an AP, |
| $C_{av}$ = | Current available capacity, |
| $B_g$ = | Nominal bandwidth requirement for Class 1 users, |
| $B_s$ = | Minimum bandwidth requirement for Class 2 users, |
| $B_{snom}$ = | Nominal bandwidth for Class 2 users. |

15. The method of claim 14, wherein Class 2 users attempt to choose an AP with received strength P that has the maximum value $$[C - (\text{Sum}\_\{i=1\}^\{i=n\_g\} B\_g(i)) - \text{Sum}\_\{i=(n\_g+1)\}^\{i=n\_g+n\_s\} B\_s(i))].$$

* * * * *